(12) United States Patent
Raichlen

(10) Patent No.: US 6,540,242 B1
(45) Date of Patent: Apr. 1, 2003

(54) HAND TRUCK WITH INTREGAL LOAD CLAMP

(76) Inventor: Steve E. Raichlen, P.O. Box 968, Friday Harbor, WA (US) 98250

( * ) Notice: Subject to any disclaimer, the term of this patent is extended or adjusted under 35 U.S.C. 154(b) by 16 days.

(21) Appl. No.: 09/949,578

(22) Filed: Sep. 11, 2001

(51) Int. Cl.[7] .................................................. B62B 7/02
(52) U.S. Cl. .............................. 280/47.27; 280/47.24; 280/47.28; 280/47.29; 280/47.35; 414/456
(58) Field of Search ........................... 280/47.28, 47.27, 280/47.24, 47.29, 47.85; D84/24, 27; 414/454, 455, 456; 269/6, 227

(56) References Cited

U.S. PATENT DOCUMENTS

| | | | | |
|---|---|---|---|---|
| 561,151 A | * | 6/1896 | Adrianse | 269/210 |
| 590,436 A | * | 9/1897 | Marvel | 414/454 |
| 1,429,918 A | * | 9/1922 | Allen | 280/47.27 |
| 1,512,454 A | * | 10/1924 | Cade | 280/47.27 |
| 1,517,951 A | * | 12/1924 | Cade | 280/47.27 |
| 1,895,640 A | * | 1/1933 | Norling | 414/451 |
| 2,361,971 A | * | 11/1944 | Shipman | 59/7 |
| 2,504,373 A | * | 4/1950 | Andrews et al. | 269/210 |
| 2,795,433 A | * | 6/1957 | Moriarty | 280/47.28 |
| 3,278,061 A | * | 10/1966 | Christensen | 414/456 |
| 4,893,824 A | * | 1/1990 | Turek et al. | 280/47.27 |

* cited by examiner

*Primary Examiner*—Brian L. Johnson
*Assistant Examiner*—Brian Swenson

(57) ABSTRACT

A hand truck with an integral load restraing device comprised of an upright frame with a handle area, a toe plate which extends forwardly from the bottom of the upright frame and a pair of wheels mounted on the lower rear of the upright frame. Hand truck is equipped with integral universal clamping system arranged for restraining loads of varying geometric configurations back and against the upright frame of the hand truck. The integral clamping system is comprised of a telescoping clamp bar carrying a gear operated load restraining clamp equipped with universal load gripping fingers. Clamp bar and clamp telescope inwardly and outwardly to accommodate cargo of varying depth and are pivotally mounted to a lug inside the vertical slide track, allowing the clamping system to function over the entire height of the hand truck, pivot up and down, swing horizontally from side to side or, be stowed completely out of the way inside the slide track for conventional use of the hand truck.

5 Claims, 7 Drawing Sheets

FIG. 1
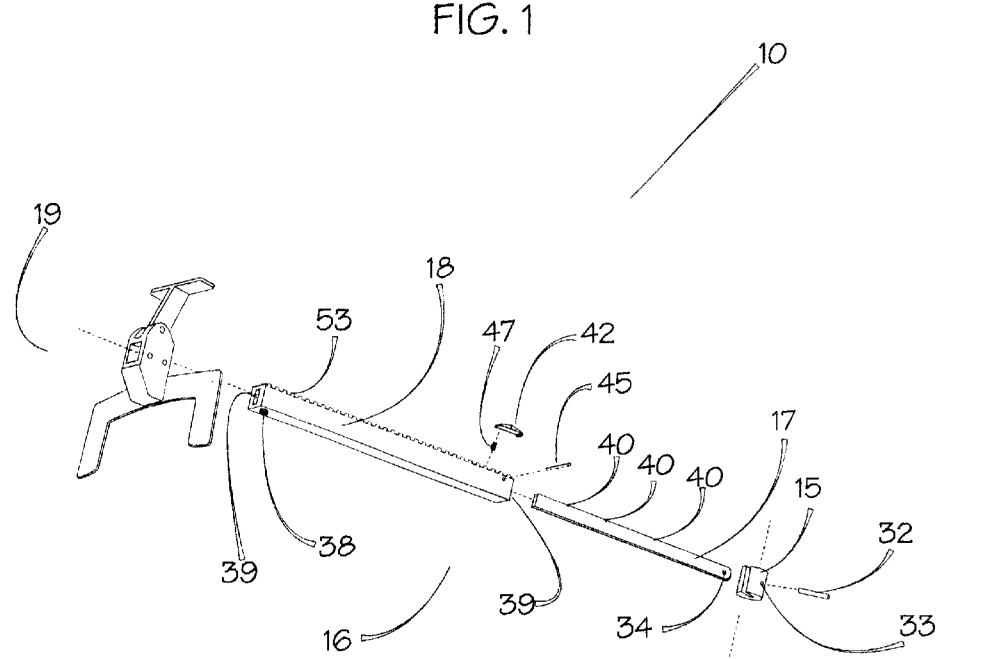
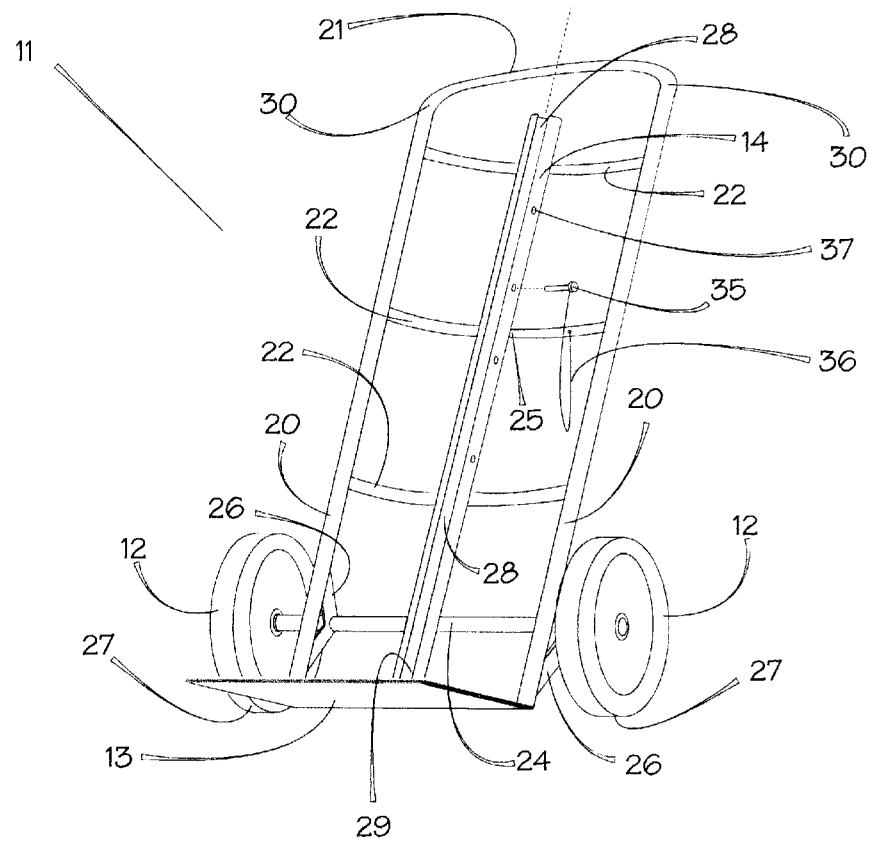

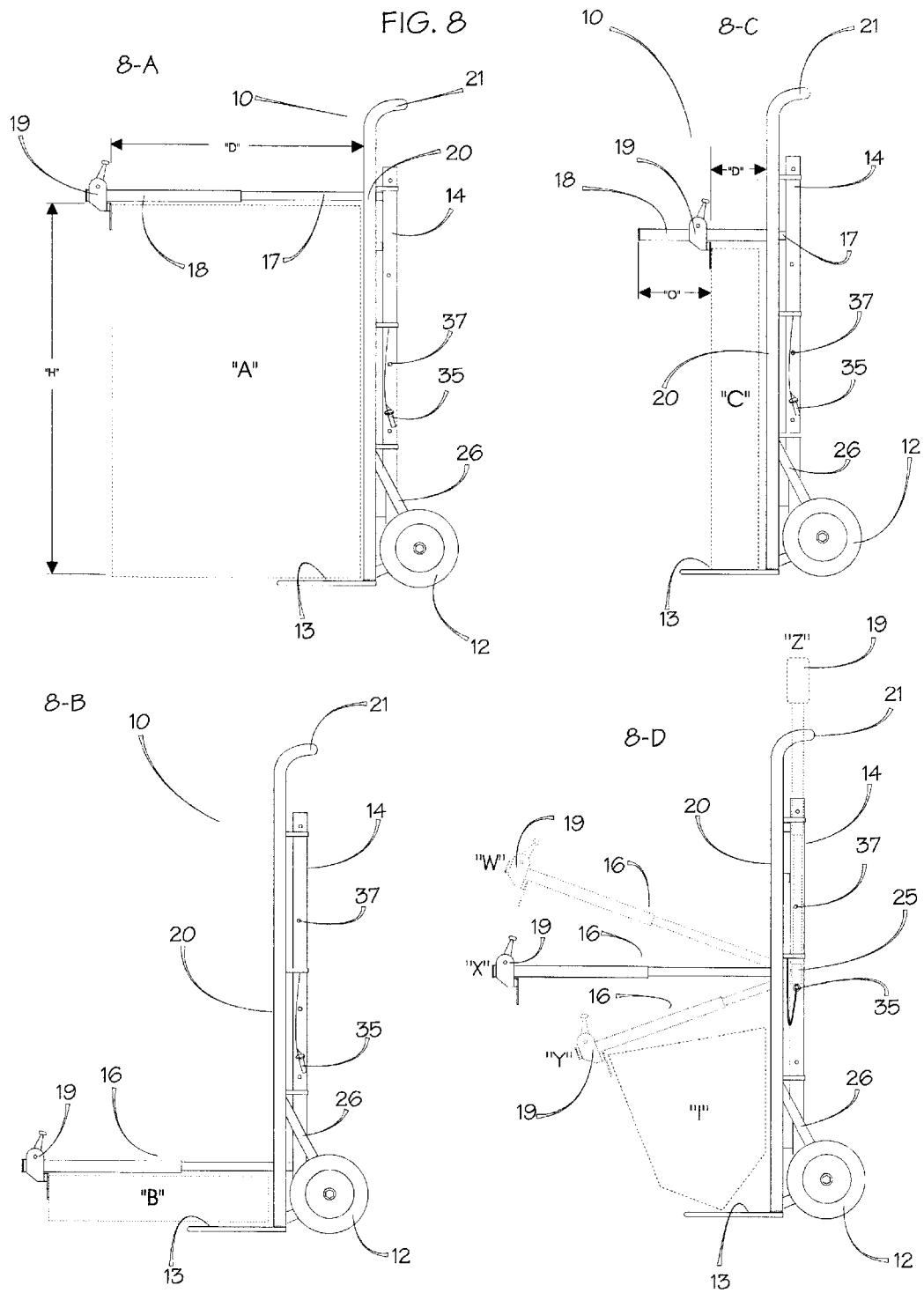

HAND TRUCK WITH INTREGAL LOAD CLAMP

BACKGROUND OF THE INVENTION

This invention relates generally to hand trucks and more particularly to a two-wheeled hand truck with integral universal clamping system for securing a load to the hand truck.

Conventional upright two wheeled hand trucks of various designs are well known and have been in use in and around warehouse spaces and cargo docks for many years. They are generally of simple metal construction consisting of an upright frame extending vertically from a load bearing platform or toe plate, a handle area at the top of the upright frame and a set of wheels located near the bottom of the upright frame located on either side of the toe plate. Although hand trucks in their basic simple form are reasonably functional, a universal and common problem involving the use of this type of load transporting device has been the actual loading of cargo onto the hand truck and restraining or securing to the hand truck the many shapes and sizes of loads they are required to accommodate in normal operation. The general procedure for loading a hand truck requires the operator to slide a toe plate located at the base of the upright frame under the load to be moved, then hold the cargo back against the upright frame of the hand truck with one hand while tilting or pivoting the frame back locating the load directly over the wheels into the balanced position necessary for easy transport. It is often necessary when a particular load is too great in one or more dimensions to secure the help of another person to provide back pressure necessary for holding the load back in place against the upright frame and on the toe plate of the hand truck while the operator pivots or tilts the load back over the wheels into the balanced position for transport. It is also necessary in most cases for the operator to hold or stabilize the load with one hand to insure that the load remains in place on the hand truck while simultaneously keeping the load balanced over the wheels while pushing and steering the hand truck to it's destination with the other hand In an effort to better contain loads and simplify the overall handling and operation of hand trucks, a number of solutions to the loading and load restraining problem have been introduced ranging from the addition of specialized clamping or strapping mechanisms to complete and radical reconfiguration of hand truck geometry. The result has been the development of a multitude of different types of specialized hand trucks designed specifically to contain or handle a particular shape or geometric configuration of load such as filing cabinets, gas bottles, barrels and drums, luggage etc. Although these modifications have provided solutions to specific problems, they often times take away from the hand trucks ability to be used as a general-purpose device.

PRIOR ART

An example of a specialized configuration of hand truck would be Turek and Schobergs U.S. Pat. No. 4,893,824 wherein a hand truck for file cabinets is shown. Although the invention is equipped with a restraining device for containing a file cabinet, it is limited to use on loads that are roughly of the same square or rectangular configuration and size as a file cabinet if the restraining device is to be used. A load or cargo with considerably less depth than that of a file cabinet that is held in place with this retaining arm and clamping mechanism would require the unused or excess length of the retaining arm be extended back through the upright frame area where the operator is standing creating an obstruction for the operator and resulting in difficult manipulation of the hand truck Additionally, the upright frame consists of an upper frame and a lower frame that are telescopingly mated with the retaining arm extending from the upper frame section. The result of this design characteristic is that the retaining arm will only be functional over the upper half of the hand truck making it difficult to restrain flatter shaped loads or cargo with less height than a single drawer file cabinet.

Mr. Morissette's U.S. Pat. No. 4,257,729, Hand Truck, is another example of the more specialized approach; arranged with a system for clamping the bead rim of a barrel or drum thus restraining it to the hand truck. The mechanism outlined in this patent for restraining the load would be of little use for loads that did not have a bead rim or were not a similar cylindrical geometric configuration as a barrel or drum.

The "Clamping device for use on hand truck" outlined under Mr. Dunnings U.S. Pat. No. 4,492,505 is a load-clamping device added to or mounted on the upright frame sections of a hand truck. This approach is quite satisfactory for a number of load shapes and sizes, It is however somewhat more complicated to use in that the operator is required to select and mount a specific extension bar into an extension housing for restraining a particular type of load. The extension bar required would be dependant upon the type or shape of the load to be secured to the hand truck. It is important to note that the device of this invention secures the load to the hand truck with downward force compressing the load between the clamping mechanism and the toe plate of the hand truck. Although this downward force seems to be suitable for restraining certain geometric shapes of cargo for transport, In most cases it lends little support in the actual loading process as a back force which presses the load back against the upright frame of the hand truck is usually required to keep the load on the toe plate and in place against the upright frame of the hand truck when the upright frame is tilted or pivoted back over the wheels to balance the load for transport. In cases where the load extends outwardly from the upright frame of the hand truck any appreciable distance beyond the support of the toe plate, considerable downward clamping pressure would be required to hold the load securely between the clamp and toe plate to insure that the load remains against the upright frames when the hand truck is tilted back to locate the load over the wheels. As mentioned earlier, this particular step in the loading process generally requires that the load receive a backwards pressure holding the load against the upright frame of the hand truck. Excessive downward pressure as would be required to keep the load in place would further complicate the loading process if the cargo container is not substantially rigid on all surfaces such as a common square or rectangular cardboard shipping box, or if the load container has insufficient inside reinforcement In this case it may not be possible to apply the necessary downward pressure required to keep the load back against the upright frame without collapsing the container at the point where the clamping pressure actually contacts the load.

SUMMARY

These are but a few of the examples that demonstrate the need for a hand truck that is truly universal, in that it will accommodate and restrain cylindrical and irregular shaped cargo as well as rectangular shapes over the entire height of the hand truck frame, is easily loaded by one person, has the capability to provide the load holding or restraining forces back against the entire length of the upright frame where it does the most good and can still be used in a conventional manner if clamping or load restraint is not necessary.

The present invention offers forth a universal hand truck with an integral clamping system designed to overcome the problems outlined above; comprising an upright frame section formed by two parallel tubular sections joined on the top end to form a handle, a toe plate which joins the upright frame sections at the bottom and extends forward or outward from the base of the upright frame providing for a load bearing surface. A pair of wheels mounted one on either end of the toe plate in such a way as to allow the upright frame to be pivoted or tilted back to locate the load over the wheels or free stand when not in use, supported by the two wheels and the toe plate. A plurality of horizontal metal straps are provided as cross ties extending between the two upright tubular sections adding strength and rigidity to the upright frame of the hand truck. Cross ties are formed in a slight concave arc to provide clearance for a vertical slide track and substantially fixed horizontally between the toe plate and handle of the two upright tubular sections that form the upright frame with approximate equal spacing.

A vertical slide track for carrying a sliding piston or slide lug and the load-clamping device is fixedly attached to each of the cross ties at a point equal distance between and parallel to the parallel tubular sections that form the upright frame. The vertical slide track is fixedly attached to the top of the toe plate and extends to the uppermost cross tie located a short distance below the frame handle at the top of the hand truck. A front portion of the tubular wall section of the vertical slide track is cut away over the entire length of the vertical slide track to allow for clearance of a coaxial clamping bar and clamping device which pivotally attaches the slide lug to the coaxial clamping bar allowing the load clamping device to be slid from the toe plate to the top of the vertical slide track providing for the ability to clamp or restrain a load over the entire vertical capacity of the upright frame of the hand truck.

A load clamping device designed to provide for load restraint by applying a clamping force back against the upright frame portion of the hand truck is capable of securing cylindrical, rectangular or irregular shaped loads that fit within an envelope defined by the height of the hand truck and the length of a coaxial bar clamping device. The clamping device consists of a telescoping coaxial clamping bar and a clamp body provided for with load retaining fingers. The coaxial bar which the clamp body is fitted to consists of a plurality of sections, one fitting inside the other and allows for telescopically extending the bar of the clamping device without overhang or obstruction created by an unused portion of a clamping bar when containers or loads that have minimal depth are secured to the hand truck. The clamping body is arranged to slide over the outside tube of the coaxial bar and is equipped with a means for rapidly locating and locking the clamping body to any point along the length of the outside tube of the coaxial bar. The clamping body has dual flex mounted clamping fingers located on either side of the clamping body and extending downward and arranged to restrain flat, cylindrical and irregular shaped containers or loads. Clamping fingers are engaged providing the necessary back directed force for securing or restraining the load by a simple operator activated handle conveniently located on the top of the clamping body.

When not in use, the telescoping coaxial clamp bar is collapsed, the clamping body is slid to a stop at the outermost end of the outside tube of the coaxial clamping bar, The clamping device is pivoted to a vertical position on the slide lug and the slide lug and clamping device is slid down into a vertical slide track to a stored position freeing the hand truck for conventional uses that do not require clamping or restraint of the load.

It is the object of this invention to provide a hand truck with an integral load-restraining device. It is also an object of this invention to provide a load-restraining device that can accommodate both cylindrical and rectangular shaped cargo. It is a further objective of this invention to restrain the load by applying a backward force. It is still a further objective to provide a clamping device that collapsible and can be retained inside the hand truck when not in use The foregoing objects including other advantages of the present invention will become obvious to those skilled in the art to which the invention pertains upon review of the following detailed description and drawings in which,

BRIEF DESCRIPTION OF DRAWINGS

FIG. 1 is a perspective view of the primary components of the hand truck with an exploded view of the clamping components.

FIG. 8 is a side view showing hand truck load clamping characteristics and clamp stowage when not in use.

DETAILED DESCRIPTION

Figure 2:
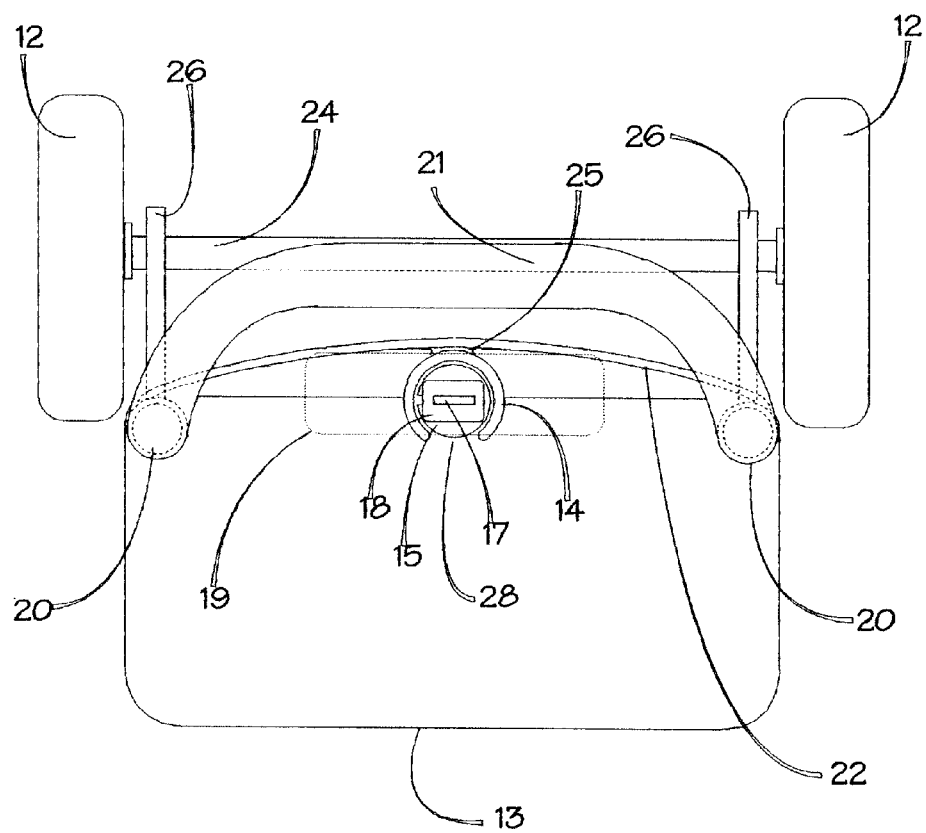
FIG. 2 is a top view of hand truck

Referring now to FIG. 1 which shows an exploded view of the hand truck 10 of the present invention including upright frame 11, a pair of wheels 12, a toe plate 13 a vertical slide track 14, a slide lug 15, a telescoping coaxial clamping bar 16 comprising an inside bar 17, an outside bar 18, a slide lug 15, and a geared clamp 19.

Where in upright frame 11 of hand truck 10 is of a standard height for hand trucks, (approximately 48 inches) and constructed of a tubular metallic material. Upright frame 11 is comprised of a flat metal toe plate 13, of hand truck 10. Toe plate 13 is fixedly attached to the bottom of parallel tube sections 20 which extend vertically from toe plate 13 and define the vertical load supporting surface of hand truck 10. Parallel tube sections 20 are formed at bend 30 and substantially joined at the top of upright frame 11 to form handle 21, which spans between parallel tube sections 20 and provides a means for the operator to manipulate hand truck 10. A pair of ground engaging wheels 12 are rotatably fitted to either end of axel 24. Wheels 12 and axel 24 are mounted to the lower back of parallel tube sections 20 on triangular shaped brackets 26 which extend rearward and are fixedly attached to rear of parallel tube sections 20. Wheels 12 are mounted at an attitude where wheels 12 point of contact 27 with the ground is on the same horizontal plane as the bottom surface of toe plate 13 when upright frame 11 is setting vertically and unsupported.

Referring now to FIG. 1 and FIG. 2. A plurality of slightly crescent shaped metal cross ties 22, evenly spaced one above the other between toe plate 13 and handle 21 span between and are fixedly attached to the back of parallel tube sections 20 and vertical slide track 14 providing for increased rigidity of upright frame 11. Cross ties 22 are crescent shaped to allow for clearance between vertical slide track 14 and parallel tube sections 20 when loads are placed on hand truck 10 and secured substantially with backward force against parallel tube sections 20.

Vertical slide track 14 is constructed of a heavy wall tubular member of approximately 2½ inches in diameter with a portion of the front face cut away 28 providing for clearance and pivotal attachment of inside bar 17 of coaxial clamping mechanism 16 to slide lug 15. (see FIG. 3). Vertical slide track 14 is fixedly attached at right angles to each of the crossties 22 at points 25 approximately centered and equidistance from parallel tube sections 20. The base end 29 of vertical slide track 14 is fixedly attached to the top surface of Toe plate 13 and extends vertically and parallel to parallel tube sections 20. Vertical slide track 14 is of a length approximately equal to the longitudinal dimension of upright frame 11, as defined by parallel tube sections 20, to a point where parallel tube sections 20 begin to form handle 21 at bend 30 of upright frame 11. Vertical slide track 14 inside diameter is of a dimension which will allow slide lug 15 to fit loosely inside vertical slide track 14 and slide freely within the entire length of vertical slide track 14.

Figure 3:
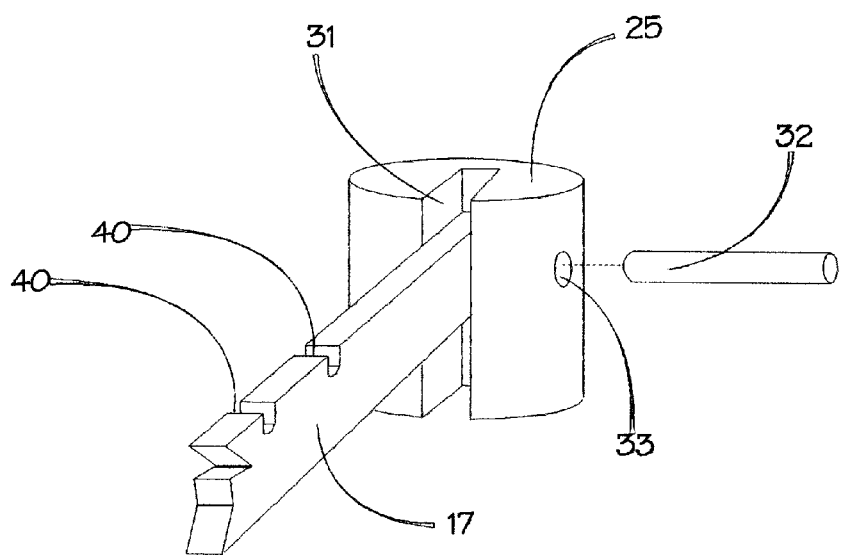
FIG. 3 is a perspective detail view of slide lug attachment to inside bar

Referring again to FIG. 1 and slide lug 15 detail drawing FIG. 3 where slide lug 15 comprises a metal or composition portion of bar stock approximately 1⅞ inches in diameter and 2½ inches long slot 31 in slide lug 15 is approximately 5/16" wide and 1 inch deep and provides for pivotal attachment of inside bar 17 of coaxial clamping bar 16 to slide lug 15 with slide lug pin 32 which passes through slide lug 15 pin hole 33, through pin hole 34 of inside bar 17 and through slide lug pin hole 33 on the opposite side of slide lug 15. It is important to note that slide lug pin holes 33 are arranged with a press fit clearance for slide lug pin 32 while pin hole 34 of inside bar 17 is provided for with a loose fit clearance between pin hole 34 and slide lug pin 32 thus allowing coaxial clamping bar 16 to extend substantially up or vertical and axially aligned with vertical slide track 14 to allow for stowage of coaxial clamping bar 16 down and substantially inside vertical slide track 14 when load restraining is not required. It should be noted that vertical slide track 14 and slide lug 15 are cylindrical in cross section allowing for coaxial clamp bar 16 and clamp 19 to be axially rotated inside vertical slide track 14 as necessary to provide additional clearance for clamp 19 when coaxial clamping bar 16 and clamp 19 are in the stowed position inside vertical slide track 14 (see FIG. 8D)

Referring again to FIG. 1A plurality of lug stop holes 37 are arranged over the length of vertical slide track 14 to provide for stop pin 35 for the purpose of limiting the travel of slide lug 15 and allowing for angular clamping of loads or clamping of loads of irregular configuration when required (see ghost lines in FIG. 8D). Lug stop holes 37 to be drilled through both walls of vertical slide track 14 are sized to provide a slip fit for stop pin 35 which limits the downward travel of slide lug 15 when stop pin 35 is secured substantially through any of the plurality of lug stop holes 37 in vertical slide track 14. A lanyard 36 of light cord or wire is fixed on one end to a cross tie 22 or some other portion of frame 11 and the other end to stop pin 35 preventing stop pin 35 from being misplaced or lost when not inserted into one of the lug stop 37 holes. Lanyard 36 to be of a length to allow stop pin 35 to be placed into any of the plurality of lug stop holes 37 in vertical slide track 14.

Referring again to FIG. 1 where coaxial clamp bar 16 comprises an inside bar 17, an outside bar 18 with clamp slide stop 38. Coaxial clamp bar 16 is a telescoping arrangement which allows for varying length of coaxial clamp bar 16 thus enabling clamping of a plurality of load configurations without excessive outward overhang "O" of the coaxial clamp bar 16 from the load (see FIG. 8C ) thus contributing to improved and less restricted maneuverability of hand truck 10 when working in confined areas. Inside bar 17 of coaxial clamp bar 16 measures approximately ¼ inch thick by 1 inch wide is approximately 24 inches long and arranged for a sliding fit inside cavity 39 of outside bar 18 with the other end pivotally attached to slide lug 15 as outlined previously. A plurality of detents 40 approximately ¼" deep and located approximately 3 inches apart over the length and on the upper or top side of inside bar 17 are provided to mate with tang 41 on clamp bar lock 42 located on the end of outside bar 18 (see FIG. 4 ) for the purpose of locking coaxial clamp bar 16 to a particular operational length as might be desired by the operator. Outside bar 18 of coaxial clamp bar 16 comprises a cast or molded tubular component with a rectangular cross section measuring approximately 1½ inches high and 1 inch in width and approximately 26 inches in length. Outside bar 18 to have a rectangular hole through its length, forming cavity 39 with cavity 39 being of a dimension offering proper slip fit clearance for inside bar 17 to be telescopingly received by outside bar 18. Outside bar 18 is provided for with geared surface 53 arranged in a configuration that will provide for geared tooth 54 (see FIG. 4) profile and pitch to properly mesh with tooth profile of gear 64 on handle 65 of clamp 19 (see FIG. 7) A screw threadedly attached to the slide surface 55 (see FIG. 6) of outside bar 18 on the end opposite face 52 of outside bar 18 serves as slide stop 38 preventing clamp 19 from being slid off the end of outside bar 18.

Figure 4:
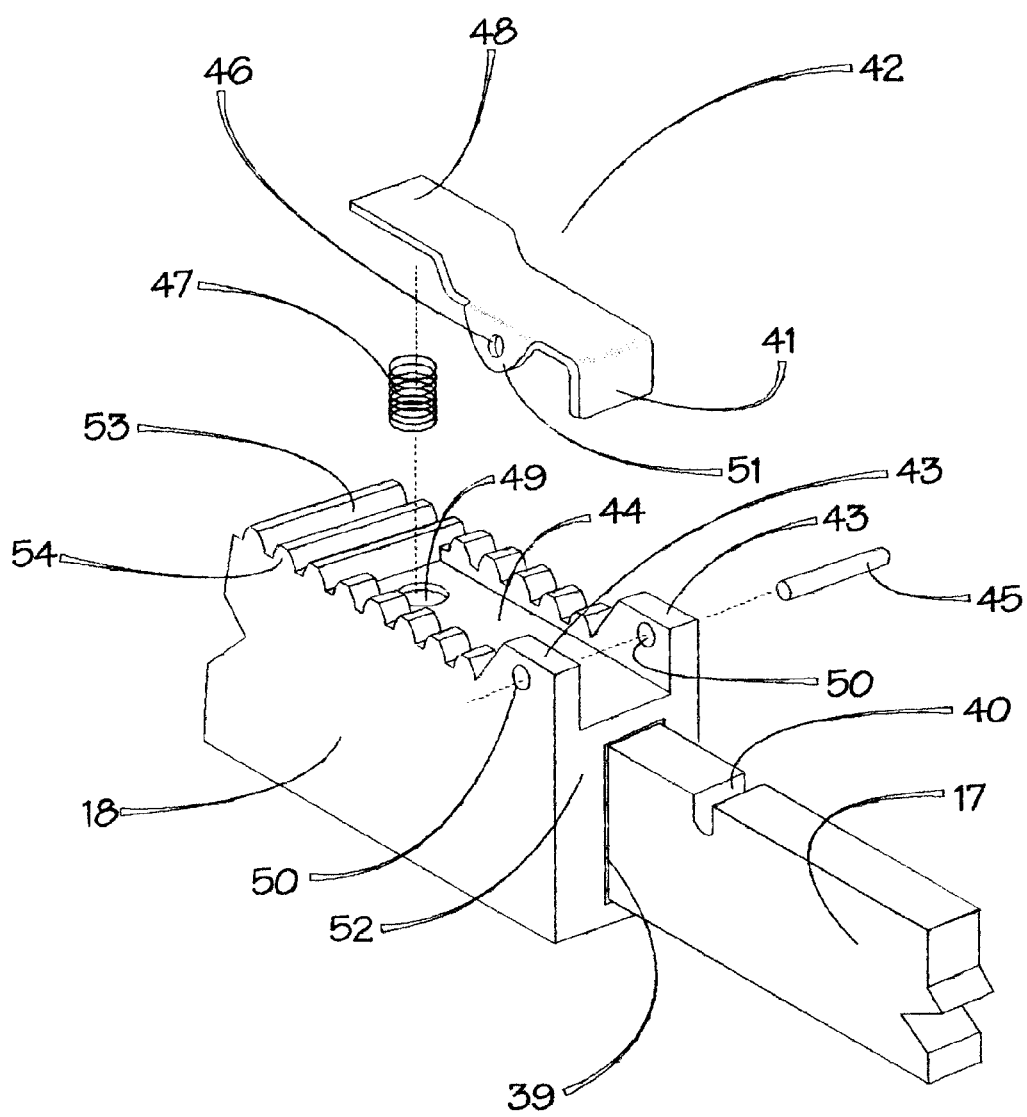
FIG. 4 is a perspective detail view of the coaxial clamp bar lock

Referring now to FIG. 4 showing clamp bar lock 42 and geared surface 53 of outside bar 18 which extends over entire length of outside bar 18. Geared surface 53 adjacent to face 52 end of outside bar 18 is provided for with relief 44, spring seat 49 and ramps 43 to facilitate operational attachment of clamp bar lock 42. Clamp bar lock 42 to be a pressed, stamped or molded component approximately ¾ inches wide and 2¼ inches in length and provides for maintaining length adjustment of coaxial clamp bar 16 as might be required by operator to contain various load configurations on hand truck 10.

Figure 6:
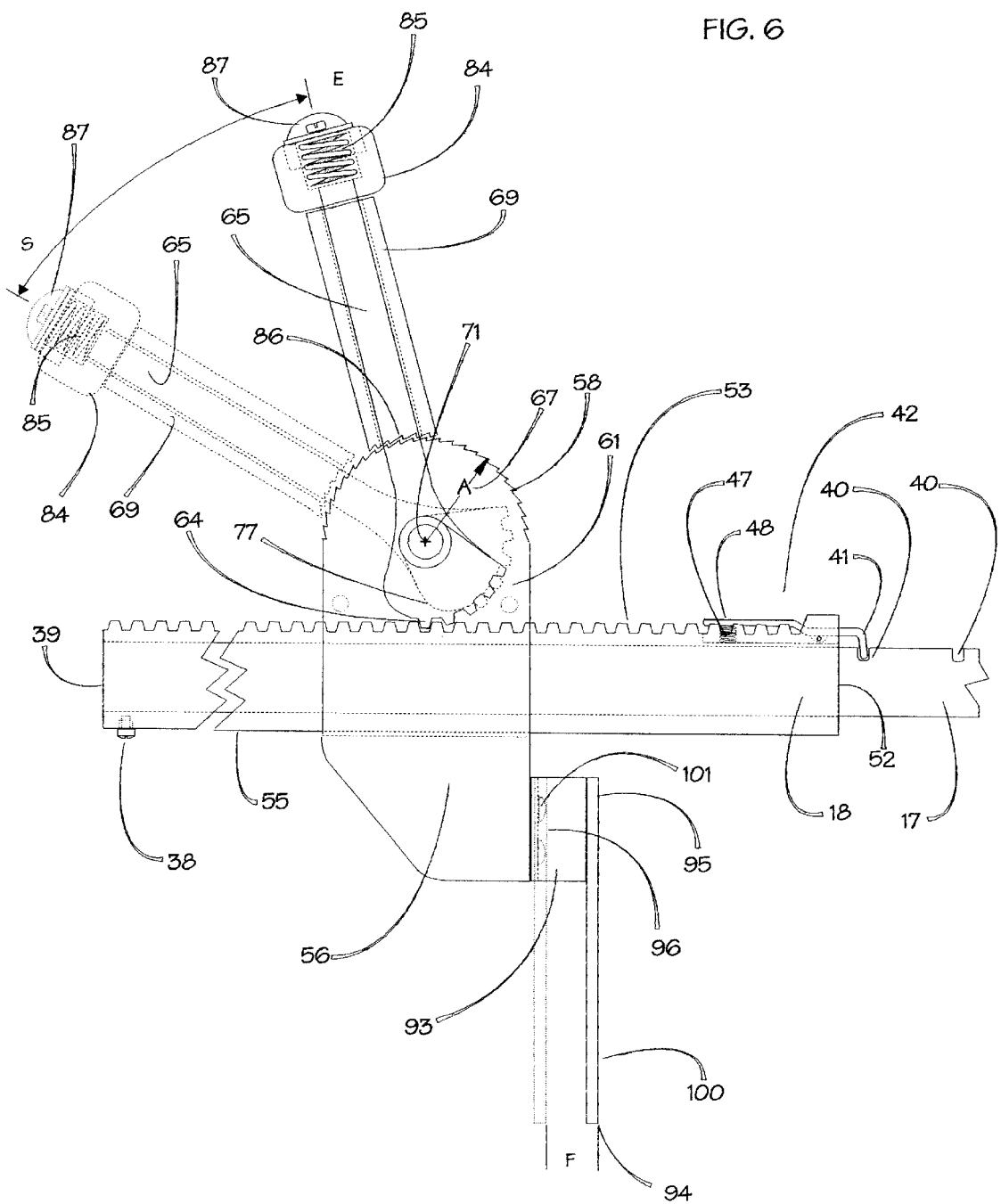
FIG. 6 is a side view of clamp handle free sliding position and engagement

Clamp bar lock 42 is pivotally mounted in relief 44 between ramps 43 located on face 52 end of outside bar 18, and secured with retaining pin 45 which is press fit through pivot holes 50 in ramps 43 of outside bar 18 and provided for with a slip fit through retainer holes 46 on tabs 51 on clamp bar lock 42. A return spring 47 is provided for applying upward force to bottom side of press tab 48 resulting in a pivotal motion of clamp bar lock 42 around retaining pin 45 resulting in a downward or locking force to lock tang 41 holding lock tang 41 substantially in detent 40 as shown in FIG. 6. Return spring 47 seat 49 is a shallow indentation of about 0.050 inches in depth and is located in relief 44 of outside bar 18 seat 49 retains return spring 47 in relief 44 maintaining proper vertical alignment of return spring 47 between bottom side of press tab 48 and relief seat 49. In operation, when press tab 48 is depressed, clamp bar lock 42 pivots on retaining pin 45 causing locking tang 41 to be lifted from detent 40 of inside bar 17 allowing inside bar 17 to slide freely within cavity 39 of outside bar 18 to facilitate lengthening or shortening coaxial clamping bar 16 as required by the operator for restraining a particular load configuration with outside bar 18 in the approximate position required, the nearest detent 40 on inside bar 17 is aligned with locking tang 41, press tab 48 is released allowing locking tang 41 to seat into detent 40 of inside bar 17 locking the length of coaxial clamping bar 16 to the particular desired length.

NOTE. In reference to the following clamp description. As there are a number of gear types and profiles that could be utilized while staying within the confines of this invention actual engineering specifications for gear profile, design and tolerances of the clamp are not outlined as part of this description.

Figure 5:
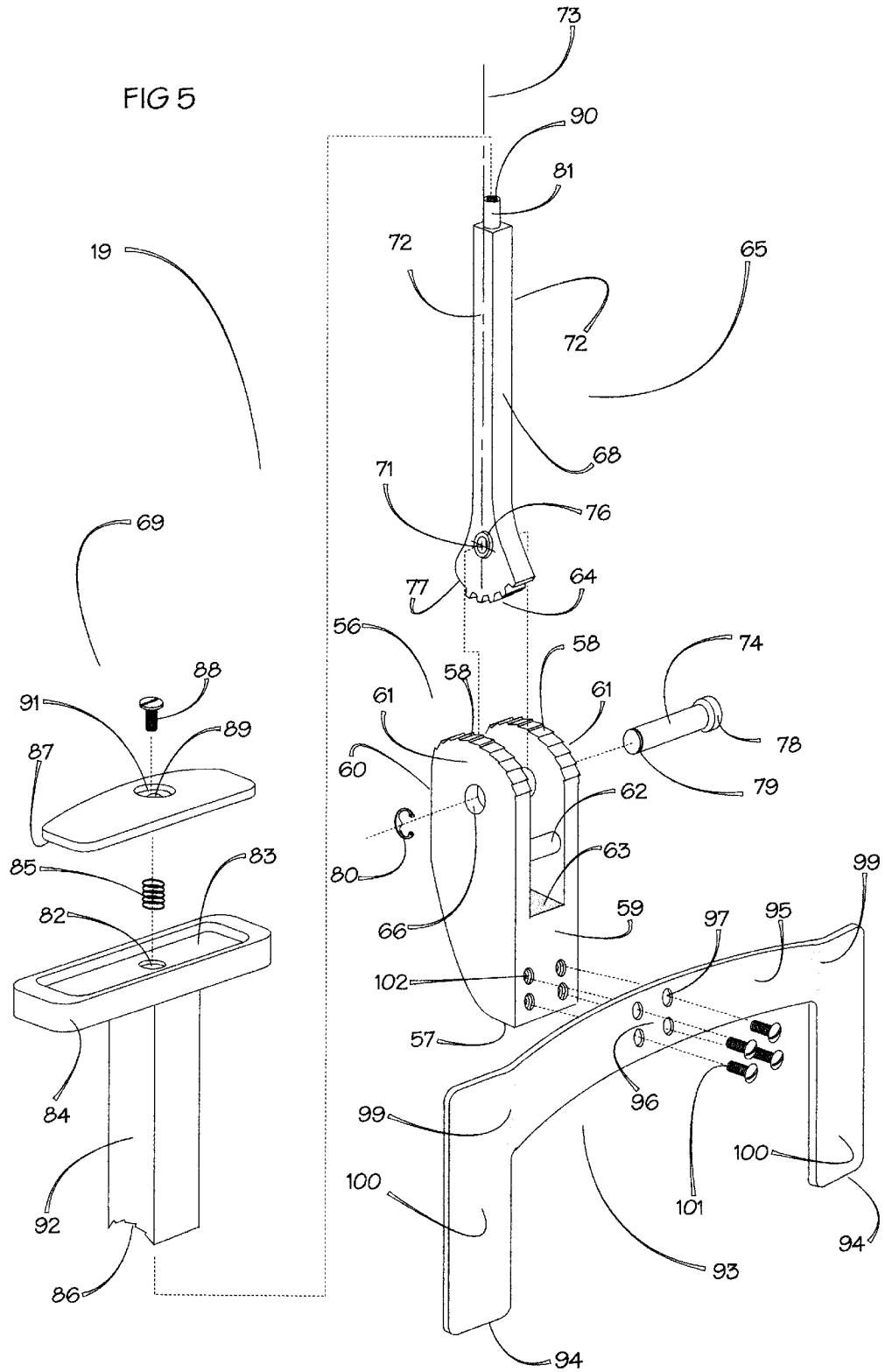
FIG. 5 is an exploded view of the clamp components

Referring now to FIG. 5 showing a blowup view of gear clamp 19 whereby clamp 19 comprises a body 56 which is molded of a composition material, cast from metal, or otherwise fabricated. Body 56 to be approximately 6¼ inches high from base 57 to top of body ratchets 58, approximately 1⅞ inches from front surface 59 to back surface 60 and 1½ inches in width measured between outside surfaces of cheeks 61. Each of the two cheeks 61 are provided for with a molded in uni directional tooth or ratchet profile 58 for mating with ratchet teeth 86 on clamp lock 69. Ratchets 58 are configured to allow clamp lock 69 of clamp 19 to be moved to the "E" or engaged position (see FIG. 6) or "C", clamped position (see FIG. 7) and be automatically locked in position by downward pressure of spring 85 of clamp lock 69. Two integral spacers 62 approximately ¼ inch in diameter are molded or otherwise provided between inside surfaces of cheeks 61 for the purpose of adding strength to body 56 and maintaining slip fit containment of outside bar 18 between base 63 of body 56 and gear 64 located on the lower end of handle 65. Holes 66 are bored substantially through each cheek 61 of clamp body 56 to provide for pivotal attachment of handle 65. Holes 66 to be approximately ⅜" diameter. Holes 66 location to be the center point of radius "A" 67. (See FIG. 6) Radius "A" 67 to be approximately 1½ inches also defines the radius of ratchets 58 located on cheeks 61 of body 56.

Handle 65 on clamp 19 is provided for applying the force required to move clamp 19 along outside bar 18 back toward parallel tube sections 20 of upright frame 11 and hand truck 10. Handle 65 of clamp 19 to be a metal or composition material approximately 7 inches long with core 68 cross section to be approximately ½ inch square in shape providing a dimension that will allow for a sliding fit of clamp lock 69 when clamp lock 69 is slid over core 68 for reasons that will be explained later. Gear 64 to have a radius of approximately 1¼ inches measured from the center of hole 71 on handle 65 with a pitch diameter and gear tooth profile arranged mate with geared surface 53 when outside bar 18 is assembled into clamp body 56. Gear 64 to be manufactured substantially integral to handle 65. Hole 71 to be approximately ⅜ inches in diameter and bored substantially through core sides 72 of core 68 on vertical centerline 73 of core 68. Hole 71 provides for pivotal mounting of handle 65 into clamp body 56 when assembled and retained with pin bearing 74. Bushing collars 76 defined by a raised portion of material approximately 1/32 inches high around the circumference of hole 71 on either side of core 72 serves to decrease friction between core sides 72 of handle 65 and inside surfaces of cheeks 61 when handle 65 is assembled in body 56. Handle 65 is assembled into body 56 by first orienting heel 77 of gear 64 to face toward the back surface 60 of body 56. Handle 65 is then slid straight down between inside of cheeks 61 and spacers 62 to a point where hole 71 in handle 65 is directly aligned with cheek holes 66. Pin bearing 74, sized to slip fit into holes 66 in cheeks 61 and hole 71 in handle 65 to be inserted through first cheek hole 66, through hole 70 of handle 65 and on through second cheek hole 66 and seated to a point where head 78 of pin bearing 74 contacts outer surface of cheek 61 on body 56. Snap ring 80 to be inserted into pin bearing groove 79 securing handle 65 into clamp body 56.

Gear 64 on handle 65 is arranged with heel 77 providing a relief for disengagement clearance between teeth on gear 64 and geared surface 53 of outside bar 18 when handle 65 is in the "S" or slide position (see FIG. 6) allowing clamp 19 to be slid freely in either direction on outside bar 18.

Clamp lock 69 is comprised of cast metal or molded composition material having a stem 92 that is rectangularly hollow to provide for sliding over handle 65 with the exception of the top end being at a point adjacent to pocket 83 providing for hole 82. Outside surfaces of stem 92 to be of square cross section measuring approximately ⅞ inches on each side. Stem 92 to be provided for with a with a griping surface 84 on one end for the purpose of lifting clamp lock 69, compressing spring 85 and disengaging ratchet teeth 86 located on the lower end of clamp lock 69 from ratchets 58 of clamp body 56. Disengagement of ratchet teeth 86 provides for unrestricted movement of handle 65 in either direction. To assemble clamp lock 69 onto handle 65, Stem 92 of clamp lock 69 is slid over handle 65 to a point where stud 81 of handle 65 protrudes through hole 82 in pocket 83 of grip 84. Clamp lock 69 is held in the normal downward locking position by spring 85 which is fitted over stud 81 on handle 65 between pocket 83 and underside of cap 87 during assembly. Cap 87 is fixedly attached to stud 81 on handle 65 with retaining screw 88. Retaining screw 88 passes through hole 89 in cap 87, through spring 85 and is threadedly secured in threaded hole 90 to a point where head of retaining screw 88 is seated in countersink 91 of cap 87. Ratchet teeth 86 are formed into base end of stem 92 of clamp lock 69 and are configured with a tooth geometry and radius that will provide for mated engagement with ratchets 58 on cheeks 61 of clamp body 56. A light upward or lifting motion by the operator applied to grip 84 on handle 65 disengages clamp lock 69 ratchet teeth 86 from ratchets 58 allowing for free movement of handle 65 back to the "S" position (see FIG. 6) allowing clamp body 56 to move outwardly on outside bar 18 thus relieving pressure of clamp 19 and fingers 94 on the load to enable unclamping of load. Flex pad 93 with load restraining fingers 94 threadedly attached to front surface 59 of clamp body 56 provide for direct contact and containment of load between fingers 94 of clamp 19 and parallel tube sections 20 of hand truck 10. Fingers 94 are arranged to accommodate both flat surface loads and cylindrical shaped loads by allowing clearance for the radius of cylindrical shaped loads between fingers 94. Flex pad 93 to be stamped, molded or otherwise constructed of a material with substantial spring like characteristics in an inverted "U" configuration approximately 10 inches wide measured from outside to outside of fingers 94 and approximately 6 inches high measured from top of spring back 95 to tip of fingers 94. Spring back 95 of flex pad 93 to be of material approximately ⅛$^{th}$ inch thick and 1½ inches wide and formed to a concave configuration with approximately ⅞ inches between front surface 96 at the point where mounting holes 97 pass through spring back 95 to front faces 100 of fingers 94. This distance also defines the amount of flex or "F" of spring back 95 and flex pad 93 as shown in FIG. 6. Fingers 94 of flex pad 93 to extend in a downward direction from top of spring back 95 approximately 6 inches. Fingers 94 to be approximately 1½ inches wide and bent back at point 99 where they converge with ends of spring back 95 to an attitude where front faces 100 of fingers 94 are roughly parallel to front surface 59 of clamp body 56. Flex pad 93 to be threadedly attached to face 59 of clamp body 56 with four mounting screws 101 which pass through mounting holes 97 in spring back 95 of flex pad 93 and seat into each of four threaded holes 102 located on lower face 59 of clamp body 56. Referring again to FIG. 6 illustrating a side view of clamp 19 and coaxial clamping bar 16 for the purpose of operational explanation wherein press tab 48 on clamp bar lock 42 is depressed allowing operator to slide outside bar 18 either inwardly or outwardly on inside bar 17 to the approximate desired length and allowing locking tang 41 to seat into one of the plurality of detents 40 on inside bar 17 when press tab 48 is released thus locking coaxial clamping bar 16 at the approximate length required as determined by the operator. With handle 65 in the "S" or slide position, as shown with the ghost lines, heel 77 of gear 64 is rotated to a position allowing for clearance between geared surface 53 of outside bar 18 and heel 77 of gear 64 of handle 65 allowing operator to freely slide or position clamp 19 in either direction on outside bar 18 as required to provide for initial contact of fingers 94 of clamp 19 to contact load positioned on hand truck 10. Upon contact of fingers 94 to the load., clamp handle 65 is rotated forward approximately 45 degrees to the "E" or engaged position where tooth geometry of gear 64 engage the tooth geometry of geared surface 53 of outside bar 18.

Figure 7:
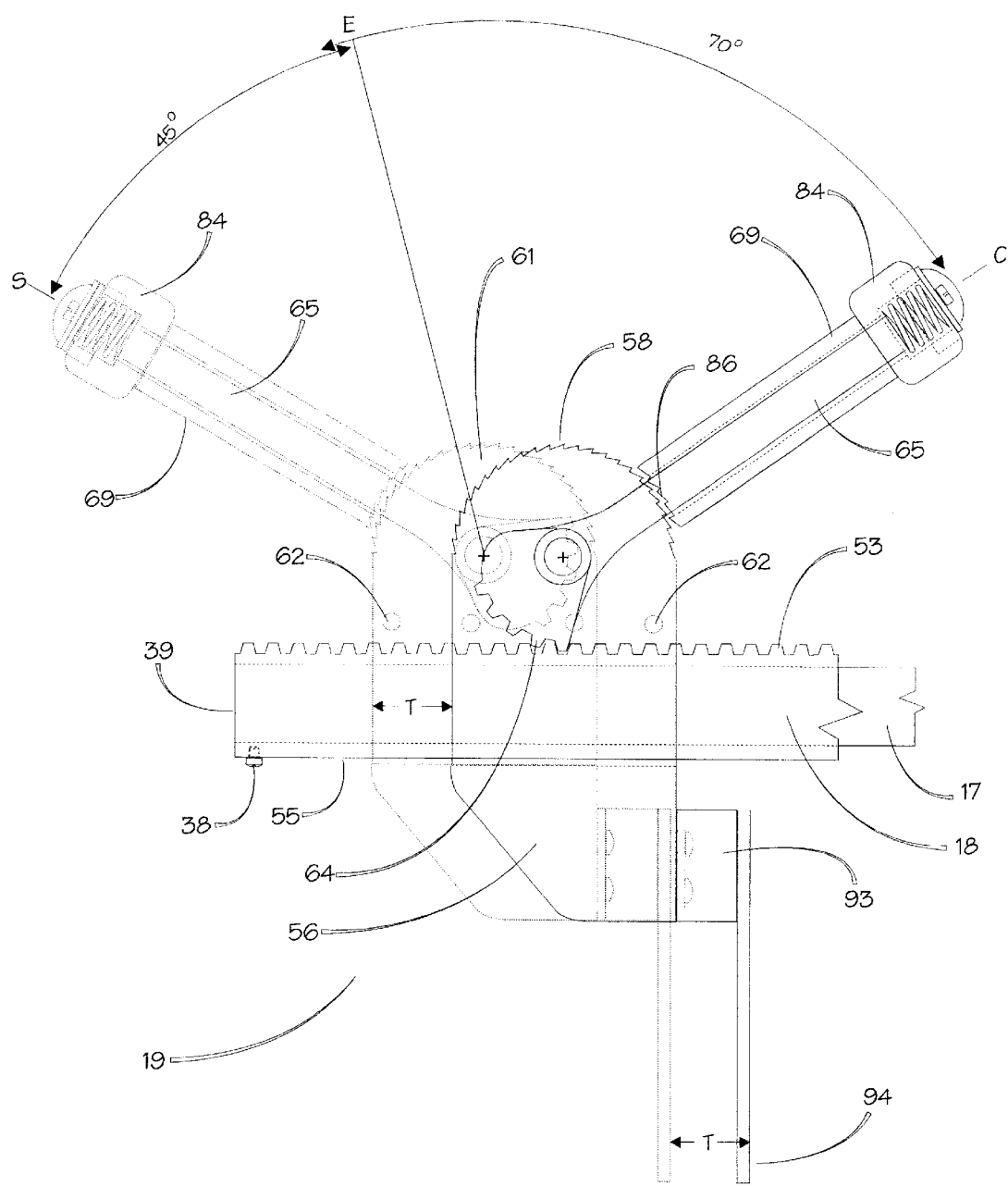
FIG. 7 is a side view of clamp travel

Referring now to FIG. 7 which shows the actual clamping process wherein tooth geometry of gear 64 on handle 65 of clamp 19 is fully engaged with tooth geometry of geared surface 53 of outside bar 18 resulting in clamp 19 travel "T" as required for secure clamping when handle 65 is advanced approximately 70 degrees and toward the clamped or "C" position. Fingers 94 of clamp 19 will be retained in position by the interlocking of ratchet teeth 86 on clamp lock 69 and ratchets 58 on cheeks 61 of body 56 until operator lifts grip 84 on clamp lock 69 disengaging ratchet teeth 86 from ratchets 58 on cheeks 61 of body 56 thus allowing handle 65 to be moved back to the slide or "S" position, relieving clamping pressure on fingers 94.

Referring now to FIG. 8 showing side views of the various types of loads hand truck 10 can accommodate. Wherein FIG. 8-A depicts the maximum size load "A" that can be clamped on hand truck 10 where maximum horizontal length of the load "D" is determined by the distance measured between fingers 94 of clamp 19 and parallel tube sections 20 of upright frame 11 of hand truck 10 and maximum load height "H" will be determined by the measurement between the top surface of toe plate 13 on upright frame 11 and the uppermost point of vertical slide track 14, where slide lug 15 and Coaxial clamping bar 16 can be positioned.

FIG. 8-B shows a flat load configuration "B" wherein clamp 19, coaxial clamping bar 16 and slide lug 15 have been slid down and positioned near the bottom of vertical slide track 14 for the purpose of clamping and transporting a geometrically flat load with hand truck 10.

FIG. 8-C shows load "C" of a configuration that is relatively high but with little depth. It is important to note that with loads of this geometric configuration, coaxial clamp bar 16 provides for clamp 19 and outside bar 18 to be telescoped or slid substantially over inside bar 17 resulting in a considerable reduction in overhang "O" of the clamping system thus allowing for easier and less restricted maneuvering of hand truck 10.

FIG. 8D shows the ability of coaxial clamp bar 16 and clamp 19 to be utilized at various angles as illustrated by positions "W", "X", and "Y" as might be required for clamping irregular shaped loads "I". Also shown in FIG. 8D, Stop pin 35 inserted into one of the plurality of lug stop 37 holes which retains slide lug 15 at a selected height in vertical slide track 14 as may be required by operator to aid in clamping various irregular shaped loads on hand truck 10. Ghost lines show coaxial clamp bar 16 in position "Z" angled vertically on slide lug 15 and in position to stow the clamping system by sliding coaxial clamp bar 16, and slide lug 15 down the inside of vertical slide track 14 providing for conventional use of hand truck 10 which may not require clamping of the load. It can be seen that the forgoing description of the preferred embodiment satisfies the objectives of the invention in that the load-restraining device for the hand truck is an integral part of the hand truck frame however can be completely stowed within the frame allowing for conventional use of the hand truck when required-The restraining unit also is capable of clamping a wide variety of load configurations including cylindrical shapes by applying a backward force against the upright frame and has clamping capability over the entire height of the hand truck frame. The preferred embodiment as described herein has been presented for the purposes of illustration and description and is not intended to be exhaustive or to limit the invention to the precise form disclosed Modifications and variations to the hand truck frame as well as the clamping system as outlined herein are possible in light of the above teaching. It is intended that the scope of the invention not be limited by this detailed description but rather by the claims appended hereto.

What is claimed is:

1. A universal hand truck with integral load restraining device for transporting loads of varying geometric configuration comprising:

an upright frame, said upright frame having an upper end and a lower end with a height measured therebetween, said upper end and lower end being substantially connected by a pair of generally vertical parallel tube sections with width measured therebetween, said parallel tube sections being further connected by a handle at said upper end, and a plurality of cross ties generally equally spaced between said upper end and said lower end of said upright frame with said upright frame defining a generally vertical load supporting surface of said upright frame; a toe plate, said toe plate fixedly attached to and extending generally perpendicular and forward from said lower end of said parallel tube sections of said upright frame, said toe plate defining generally a horizontal load supporting surface;

a pair of rotatably mounted wheels mounted one on either side of said lower end of said vertical tube sections extend generally rearward from said lower-end of said upright frame;

a slide track having a top end and a bottom end and a length therebetween, said slide track positioned approximately equidistant and parallel to said parallel tube sections with said length of said slide track substantially fixed to said cross ties of said upright frame, said bottom end of said slide track being substantially connected to top surface of said toe plate on said lower end of said upright frame, said slide track providing means for sliding attachment of a coaxial clamping bar, said coaxial clamping bar to project generally outwardly from said slide track of said upright frame and travel generally vertically up or down said slide track between said upper end and said lower end of said upright frame, said attachment means of said coaxial clamping bar to be pivotal allowing said coaxial clamping bar unrestricted vertical, horizontal and angular movement over length and width of said upright frame, said coaxial clamping bar comprised of a telescoping arrangement whereby a plurality of bar sections are slidably received one inside the other with provision for said bar sections to be locked together at a plurality of points providing a means for adjustment of said coaxial clamping bar to varying working lengths, a locking clamp arranged to be slidably positioned and locked at an infinite number of points on at least one of said bar sections of said telescoping arrangement-said locking clamp provided for with a plurality of downwardly extending load restraining fingers arranged to apply force to said load restraining fingers in a backward direction against said vertical load supporting surface of said upright frame, whereby said outwardly extending toe plate of said hand truck is slid under a load to be transported, said coaxial bar and said locking clamp is extended over said load said coaxial clamp bar is positioned and locked at a required working length and said locking clamp with said load restraining fingers is positioned contacting said load and locked; keeping said load in position back and against said vertical load supporting surface and resting on said toe plate when said hand truck is tilted back locating the load over said wheels in preparation for transport.

2. The hand truck of claim 1, wherein said slide track comprises a length of tubing having a wall thickness and a circular cross section, said circular cross section having an inside diameter providing for a cylindrical shaped sliding lug, said sliding lug being a short length and of a diameter allowing free sliding contact between said inside diameter of said slide track and outside surface of said sliding lug, a forward facing section of said slide track equaling approximately one sixth of the circumference of said circular cross section to be open over the length of said slide track providing a clearance for attachment of said coaxial clamping bar to said sliding lug, said sliding lug being slotted over it's entire length, said slot arranged perpendicular to the diameter of said sliding lug with a depth of approximately two thirds of the way through the diameter of said sliding lug, said slot having a width dimension allowing for swivel attachment of said coaxial clamping bar, said inside diameter of said cross section of said slide track being of a dimension so as to allow said telescoping coaxial clamping bar to be received substantially within said inside dimension of said slide track, said slide track having a plurality of holes arranged approximately three inches apart over the length of said slide track, said holes to be approximately five sixteenths inches in diameter and substantially through both said wall thicknesses of said cross section of said slide track, said holes to provide for installation of a stop pin, said stop pin to provide a means for limiting the travel of said sliding lug inside said slide track when said stop pin is placed substantially through said holes.

3. The hand truck of claim 2 wherein said telescoping arrangement comprises a coaxial clamping bar and a clamp, said coaxial clamping bar further comprised of at least one inside bar and one outside bar, inside bar to be rectangular in cross section and approximately 24 inches long, said inside bar having a plurality of detents cut into the top surface and along the length of said inside bar providing means for locking said inside bar to said outside bar at a plurality of lengths, and an outside bar of hollow tubular cross section; rectangular in shape and approximately 24 inches in length, inside geometry of said hollow tubular cross section of said outside bar allowing for said outside bar to telescopingly receive said inside bar, said outside bar to have gear tooth profile formed into at least one outside surface; and over the total length of said outside bar, one end of said outside bar to be equipped with a spring loaded locking arrangement for interlocking with said detents on said inside bar providing a means for locking said inside bar and said outside bar to any one of a plurality of lengths, said locking clamp to be fitted to said coaxial clamping bar in a manner allowing for sliding fit of said locking clamp allowing for inwardly and outwardly sliding of said locking clamp over the length of said outside bar of said coaxial clamping bar or locking to said tooth profile of said outside bar at an infinite number of positions over said length if said outside bar, said clamp to be equipped with load restraining fingers providing a means for mating with a plurality of geometric shapes.

4. The hand truck of claim 3 wherein said locking clamp is gear driven comprised of a body, a clamp handle with gear teeth, a clamp locking means and a set of flexibly mounted load restraining fingers, said body comprised of a base, a front surface, a back surface and cheeks which extend vertically from either side of said body; integral to said body, and arranged to provide a generally rectangular clearance providing sliding fit for said outside bar of said coaxial clamping bar therebetween, said cheeks provided with a radius on their uppermost surfaces with ratchet teeth formed integral to said radius for interfacing with mating ratchet teeth on said locking clamp, said cheeks of said body arranged with means for pivotaly attaching said clamp handle with gear teeth substantially between said cheeks wherein said gear teeth of said handle will mesh with said geared tooth profile of said outside bar when said handle is in the engaging position, said handle with gear teeth pivotally mounted between said cheeks whereby said handle can be at a first non engaged position where clearance is provided by a gear heel, said heel of said gear being void of said gear teeth enabling free bi-directional sliding movement of said gear driven locking clamp on said outside bar; or at a second engaged position allowing said gear teeth to mesh with said geared tooth profile on said outside bar to provide backward motion and apply a force to said geared locking clamp, said clamp lock being a spring loaded two position device providing a means for holding said clamp handle of said gear driven locking clamp in a locked position, comprised of a hollow square cross section of tubing with a top end for griping by an operator, a bottom end with integral ratchet teeth for mating with said ratchet teeth of said cheeks on said body, inside geometry of said hollow cross section of tubing of a dimension allowing for sliding fit over said handle, said top end of said clamp lock arranged for comfortable gripping and easy lifting motion, said top end of said square cross section of tubing of said clamp lock substantially closed except for a single hole providing means for sliding attachment to said handle, said integral ratchet teeth at said bottom end of said square cross section of tubing arranged to interlock with said ratchet teeth on said cheeks, said interlock to be provided by a spring positioned between said handle and said top end of said clamp lock, said spring arranged to apply force to said clamp lock in a downward direction maintaining said interlock between said ratchet teeth on cheeks and said ratchet teeth on bottom end of said clamp lock, load restraining fingers provided with means for substantial attachment to said body of said clamp, comprised of inverted "U" shaped fingers arranged to extend downward from said clamp body providing means for substantial contact with said load; transmits force applied by said locking clamp to said load, said load restraining fingers to be of a material allowing said fingers to flex when said clamp handle is moved to said second engaged position and said force is applied to said load.

5. A track mounted, telescoping, gear actuated load clamping device for hand trucks comprising: an upright frame whereto said load clamping device is substantially attached, said upright frame having an upper end and a lower end with a height measured therebetween, said upper end and lower end being substantially connected by a pair of generally parallel vertical tube sections with width measured therebetween, said parallel tube sections being further connected by a handle at said upper end, a toe plate fixedly attached to and extending generally perpendicular and forward from said lower end of said parallel tube sections of said upright frame, a plurality of cross ties equally spaced between said upper and said lower ends of said upright frame with said cross tie ends fixedly attached to back side of said parallel tube sections between said upper end and said lower end of said upright frame, said vertical parallel tube sections of upright frame defining a generally vertical load supporting surface, and said toe plate of said upright frame defining a horizontal load supporting surface, two rotatably mounted wheels mounted on brackets, one on either side of said lower end of said upright frame, said brackets extend generally rearward from said lower end of said upright frame allowing for rolling engagement of said wheels when said upright frame is tilted backwards, a single track carrying a short cylindrical shaped sliding lug internally providing means for sliding attachment of a telescoping, coaxial bar mounted gear clamp, said single track is fixedly attached to top side of said toe plate, and extends generally vertical on said upright frame to a point slightly above uppermost said cross tie and is fixedly attached to each of the said cross ties approximately equidistant between said vertical tube sections, said track is circular in cross section, substantially forward facing portion of said cross section equal to approximately one sixth of the circumference of said circular cross section removed over entire length of said track providing clearance for attachment of telescoping member of said gear actuated load clamping device to said internally carried cylindrical shaped sliding lug, said sliding lug to be slotted lengthwise perpendicular to it's diameter with slot geometry arranged to accommodate use of a pin providing a means to pivotally join one end of said telescoping coaxial bar to said slot of said lug, said single track provided for with a plurality of holes arranged for receiving a stop pin; providing a means for restricting the sliding travel of said lug within said track, a telescoping coaxial bar pivotally attached at one end to said sliding lug providing variable length arm for mounting said gear clamp, said coaxial bar arranged for an inner bar to be telescopically received by an outer bar; one inside the other; with provision for said bar sections to be locked together at a plurality of points providing a means for adjustment of said coaxial bar to a plurality of working lengths, said outer bar of said coaxial bar having geared tooth profile on the top surface arranged to mesh with gears of said gear actuated load clamping device, said gear actuated load clamping device arranged to slidably fit over said outer bar of said coaxial bar and arranged to provide a backwardly directed restraining force to said load, said gear actuated load clamping device provided with spring loaded locking and actuating handle, said actuating handle arranged for comfortable griping by operator, said handle having a first position providing means for free slide positioning of said gear actuated load clamping device; and a second position providing engagement of said tooth profile of said outside bar and said gear on said clamp providing a means for gear actuated movement of said clamping device; applying load restraining force back and toward said vertical load supporting surface, a means for locking said clamping device at an infinite number of points on said outside bar of said coaxial clamping bar, said clamping device having a set of downwardly extending load restraining fingers arranged to mate with a plurality of geometric load configurations and apply load restraining force to said load in a direction backwardly and against said vertical load supporting surface of said upright frame, wherein said track mounted telescoping gear actuated load clamping device extends outwardly from said slide track of said upright frame, providing for a load restraining device that can apply a backward force and be locked over a load at an infinite number of extended positions within the operational length of said telescoping coaxial bar, and is provided for with a means to travel generally vertically up or down said single track, providing said backwardly directed load restraining force at any point between said upper end and said lower end of said upright frame.

* * * * *